Patented July 6, 1926.

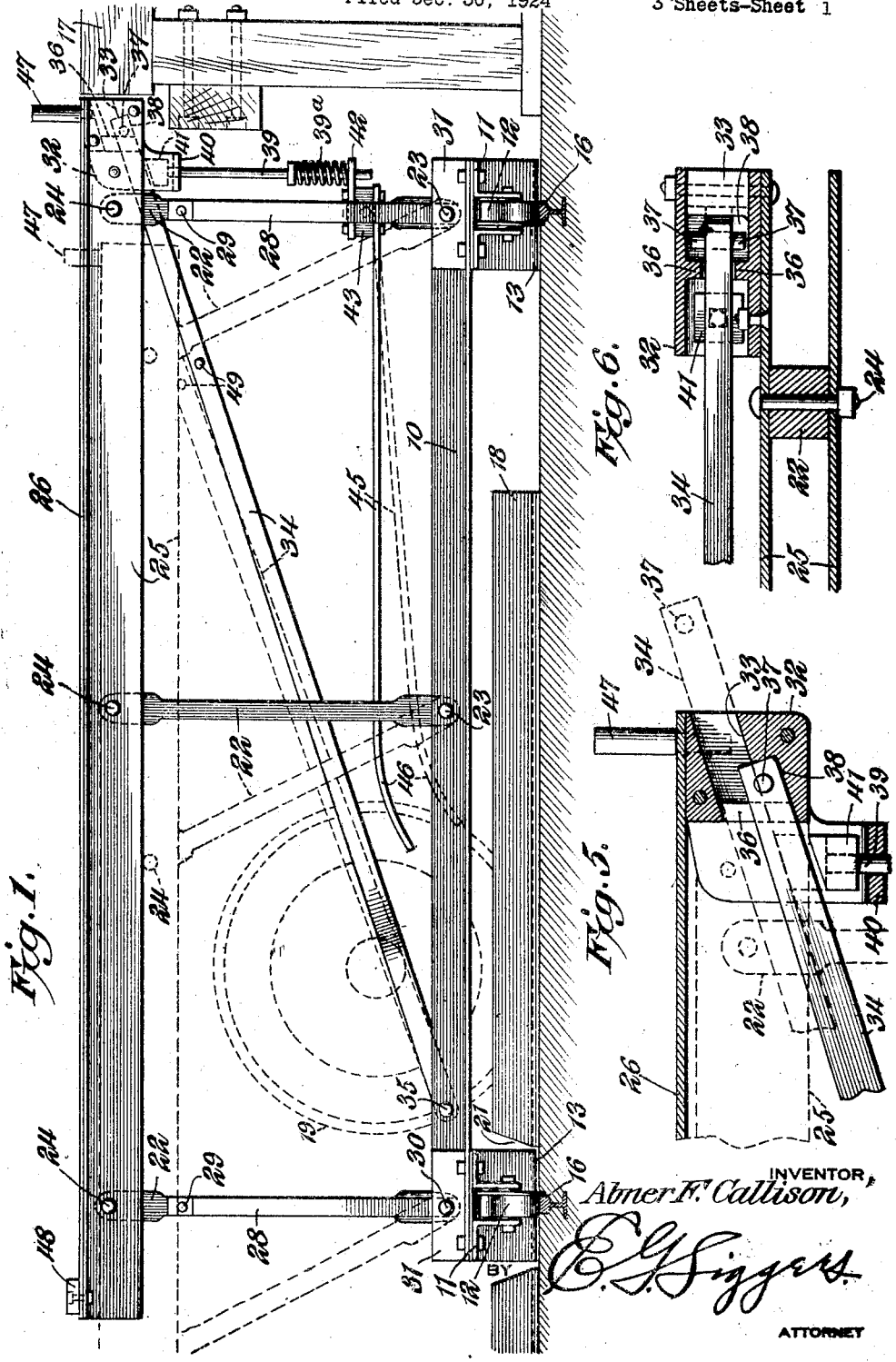

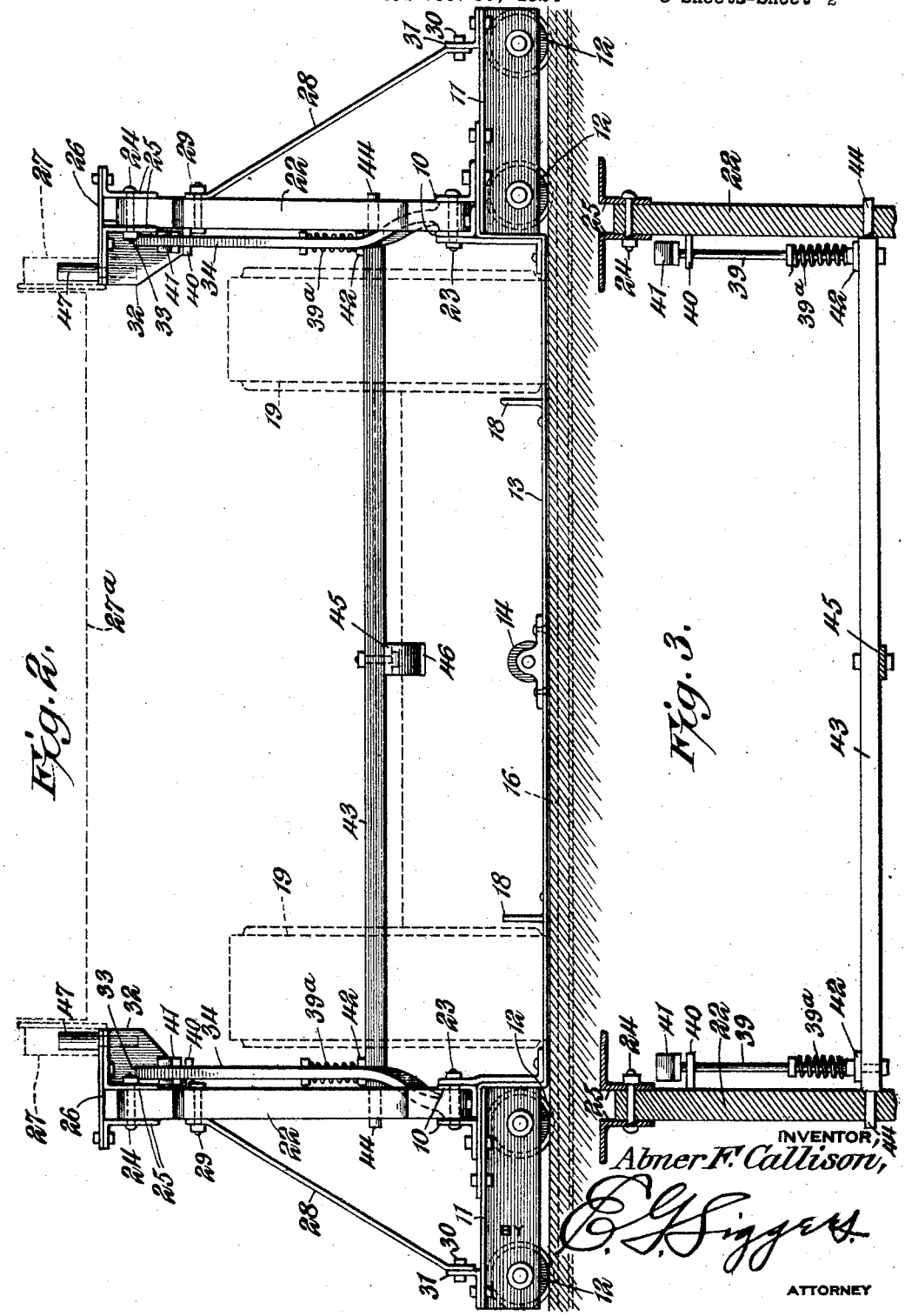

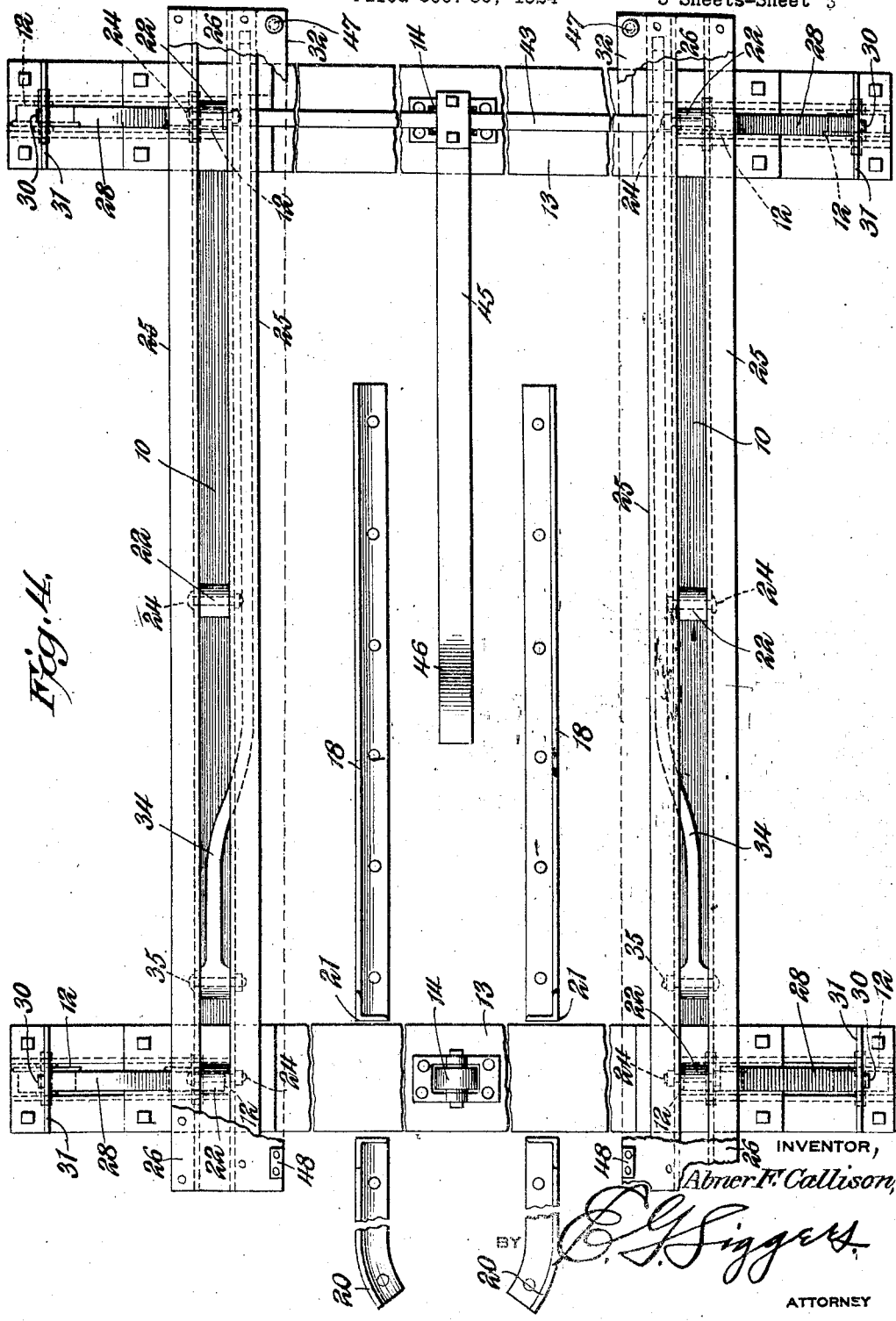

1,591,656

UNITED STATES PATENT OFFICE.

ABNER F. CALLISON, OF NEW YORK, N. Y.

LOAD-TRANSFERRING DEVICE.

Application filed December 30, 1924. Serial No. 758,852.

This invention relates to a load transferring device, especially adapted to handle large merchandise containers, with particular reference to their use for freight shipments. These containers may be of such size that one of them constitutes a complete load for a large truck, and three of them constitute a load for a railroad flat car. When box cars are used, however, the containers will be one half as large, their size being limited only by the side door of the car.

One of the principal objects of the present invention is to provide a device which may be operated automatically to lift a container clear of the truck as the latter is backed up to the warehouse platform, or to load a container onto the truck as the latter is driven away from the platform.

A further object of the invention is to provide a device on which a container may be supported and transported laterally to and from the stall, where it is transferred to and from the truck, and which may also be used as a bridge between two platforms.

The objects and advantages of the invention will be more fully explained in the following detailed description, which is to be read in connection with the accompanying drawings illustrating one practical embodiment of the invention.

In the drawings:

Figure 1 is a side elevation of the device.

Figure 2 is a front elevation thereof.

Figure 3 is a transverse section through a portion of the device.

Figure 4 is a plan view of the device.

Figure 5 is a vertical section, showing the latch mechanism in detail.

Figure 6 is a horizontal section of the parts shown in Figure 5.

The invention comprises a low rectangular carriage, having at each side a pair of longitudinally extending angle bars 10 secured at their front and rear ends to truck frames 11, each of which is supported by a pair of small flanged wheels or rollers 12. The truck frames 11 are connected transversely by flat steel bars 13, which are close to the pavement, and may be intermediately supported by rollers 14 which track with the respective wheels 12. The wheels 12 are adapted to ride on tracks 16 which are embedded in the pavement, and extend transversely in front of the warehouse platform 17. A pair of guide bars 18 are secured to the pavement and extend perpendicularly to the tracks 16 and to the front edge of the platform, and are spaced apart a suitable distance to form guides for alining the wheels 19 of the truck when the latter is backed up for the loading or unloading operation. It is preferred to curve the front ends of the guide bars inwardly, as shown at 20, in order to facilitate the proper alinement of the truck wheels. Portions of the guide bars 18 are cut away, as at 21, to form a passageway, which may be traversed by the front bar 13 of the carriage.

A plurality of parallel links 22 are pivoted at their lower ends, as shown at 23, between each pair of angle bars 10, and are pivotally connected at their upper ends, as shown at 24, between pairs of angle bars 25, which are arranged above the respective angle bars 10 and parallel thereto. Rails 26 are supported by the angle bars 25 in proper position to receive the wheels 27 of the merchandise container 27ª as the latter is lifted from the truck. It is to be understood that the links 22, on opposite sides of the carriage, are spaced apart a sufficient distance so as to receive the truck wheels 19 between them, as shown in Figure 2, as the truck is backed up to the platform, the wheels 19 being alined by the guide bars 18. The container 27ª is carried by the truck with its wheels 27 overhanging the sides thereof in position to be engaged by the rails 26, when the latter are raised.

The links 22 at the front and rear ends of the carriage are provided with braces 28, which are secured, as at 29, to the upper portions of the links, and have their lower ends pivoted, as at 30, to angle bars 31, which are secured to the truck frame 11. This insures the swinging of the links 22 in a vertical plane, and prevents the possibility of the rails 26 spreading when subjected to a heavy load.

A block 32 is secured to the rear end of one of the angle bars 25 at each side of the carriage, and has a passageway 33 extending rearwardly and upwardly therethrough which slidably receives the upper end of a latch bar 34, the lower end of which is curved outwardly and pivoted, as at 35, between the front ends of the angle bars 10. Ribs 36 project inwardly from opposite sides of the passageway 33, and are engaged by stop pins 37 secured transversely of the upper end of the latch bar to limit the rearward movement of the rails 26. The passageway 33 has a recess 38 adapted to receive the upper end of the latch bar 34 when the rails 26 have been swung upwardly, and to latch the same in that position. A release rod 39 is located beneath the upper end of the latch bar 34, and its upper end is slidably mounted in a keeper 40 formed on the underside of the block 32 and carries a head 41 which is adapted, under certain conditions, to engage and lift the upper end of the latch bar 34 out of the recess 38, so as to permit the rails 26 to swing forwardly to the position shown in dotted lines in Figure 1. The lower end of the rod 39 is resiliently supported by a spring 39ª, and guided in an arm 42 secured to and extending rearwardly from a bar 43, which extends transversely, and is formed at its ends with trunnions 44 journaled in the rearmost links 22. A lever 45 is secured centrally of the bar 43 and extends forwardly therefrom, and is provided with a downwardly curved end 46, adapted to be engaged by the rear axle of the truck as the latter is backed up to the platform. The lever 45 is thus depressed into the position shown in dotted lines in Figure 1 to lift the latch bar 34 to release position. Stop pins 47 are mounted in the blocks 32 in position to be engaged by the rear end of the container when the loaded truck is backed up into the stall. Blocks 48 are secured to the front ends of the rails 26, and are engageable by the front wheels of the container as the latter is moved forwardly in the process of transferring it to the truck.

In unloading the container from the truck, the carriage is moved along the tracks 16 into proper position with respect to the guide rods 18, and the loaded truck is then backed up to the platform, the wheels 19 of the truck being brought into alinement, as shown in Figure 2. As the truck is being backed up, the rails 26 and the links 22 by which they are supported are in lowered position, with the blocks resting against abutments 49 on the bars 34, as shown in dotted lines in Figure 1, so that the overhanging wheels 27 of the container are carried clear of the tracks 26 until the rear end of the container comes into engagement with the stop pins 47. As the truck continues to move rearwardly, the engagement of the container with the stop pins 47 causes the rails 26 to swing upwardly into engagement with the wheels 27, and to lift the container clear of the truck. The containers are coupled to the truck in such a manner as to prevent their horizontal movement with respect to the truck but to permit them to be raised. A preferred form of coupling device is described and claimed in a copending application Serial No. 758,851 filed of even date herewith. The rearward movement of the links 22 continues until they are swung to vertical position, or slightly past the same, when the pins on the upper end of the latch bar 34 engage the ribs 36 and check this movement. At this time, the container is entirely clear of the truck, and the latter, after being uncoupled, may be driven away, leaving the container on the carriage. When the links 22 reach their rearmost position, the axle of the truck has depressed the lever 45, lifting the rod 39, and holding the latch bar against the upper side of the passageway 33. The enormous weight of the container, however, will prevent it from swinging forwardly as the truck is driven away, and as soon as the axle leaves the lever 45, the rod 39 will drop down and permit the upper end of the latch to drop into the recess 38 and lock the tracks 26 in their uppermost position. By removing the stop pins 47, the container may now be immediately rolled onto the platform 17, or the carriage may be moved along the tracks 16 to some other part of the warehouse, or it may be moved into position for the container to be loaded onto the car. A winch and motor, or other suitable means, may be used for moving the carriage to the desired position.

In loading a container onto the truck, the latter is backed underneath the carriage with the container carried by the rails 26. The engagement of the truck axle with the lever 45 raises the latch bar 34 to permit the rails 26 to swing forwardly. The container is now coupled to the chassis of the truck. As the truck is now driven forwardly, the wheels of the container engage the blocks 48, and the rails 26 swing downwardly to the position shown in dotted lines in Figure 1, so that the container is free of the carriage, and is carried by the chassis of the truck.

While I have described the operation of the device in connection with a single container, it is apparent that the same method of operation may be used for loading or unloading two containers, when they are so constructed that two constitute a truck load. It is also apparent that the same device, when the rails 26 are raised, may be used as a bridge for transferring a container from the platform 17 to another platform on the other side of the tracks 16. It is also apparent that many modifications may be made in the details of construction and in the relative arrangement of the various elements without departing from the salient features of the invention. It is, therefore, my desire to include all such modifications within the scope of the appended claims.

What is claimed is:

1. In a load handling device, the combination with a truck, of a container adapted to be carried thereby, wheels journaled at the opposite sides of the container near the bottom thereof and normally disposed in longitudinal planes beyond the sides and wheels of the truck, a rectangular carriage having longitudinal bars rigidly held in spaced relation and adapted to receive the truck between them, parallel links pivotally supported on the longitudinal bars, rails carried by the links and spaced apart laterally the same distance as the wheels on opposite sides of the container, and means engageable by the container on the truck, as the latter moves rearwardly between said longitudinal bars, to swing the links and rails carried thereby upwardly and rearwardly underneath the wheels of the container to lift the latter from the truck.

2. In a load handling device, the combination with a truck, of a container adapted to be carried thereby, wheels journaled at the opposite sides of the container near the bottom thereof and normally disposed in longitudinal planes beyond the sides and wheels of the truck, a rectangular carriage having longitudinal bars spaced apart so as to receive the truck between them, transverse bars connecting the longitudinal bars, the front transverse bar being flat and adjacent the ground so that the wheels of the truck may easily pass over it, parallel links pivotally connected to the longitudinal bars so as to swing in vertical longitudinal planes, rails carried by the links and spaced apart laterally the same distance as the wheels on opposite sides of the container, and stops at the rear ends of the rails engageable by the container on the truck, as the latter moves rearwardly between said longitudinal bars, to swing the links and rails carried thereby upwardly and rearwardly underneath the wheels of the container to lift the latter from the truck.

3. In a load transferring device, the combination of a carriage having longitudinal bars rigidly held in spaced relation and adapted to receive a truck between them, guide bars for alining the truck wheels parallel to said longitudinal bars as the truck is backed in between them, parallel links pivoted on said bars and carrying rails, means engageable by the load on the truck as the latter moves rearwardly between said longitudinal bars to swing the links and rails carried thereby upwardly and rearwardly, and thereby raise the load, and wheels disposed in transverse vertical planes and supporting the carriage so that the latter may be shifted laterally.

4. In a load transferring device, the combination of a carriage having parallel longitudinal bars held in spaced relation so as to receive a truck between them, parallel links pivoted to each of the bars, rails carried by the links, a latch bar pivoted near the front end of each of said longitudinal bars and extending upwardly and rearwardly, a block secured to each rail and receiving the rear portion of the latch bar, and means carried by the bar and engageable with the block to positively limit the rearward movement of the rail, said block having a recess into which the upper end of the latch may drop, when the rail is swung rearwardly, to prevent a return movement thereof.

5. In a load transferring device, a carriage having parallel longitudinal bars held in spaced relation so as to receive a truck between them, parallel links pivoted to each of the bars, rails carried by the links, latch bars pivoted near the front ends of the respective longitudinal bars and extending upwardly and rearwardly, blocks secured to the rear ends of the rails and having passageways for receiving the rear portions of the respective latch bars, and means engageable by the load on the truck as the latter moves rearwardly between said longitudinal bars to swing the links and rails carried thereby upwardly and rearwardly and thereby raise the load, each of said blocks having a recess into which the upper end of the corresponding latch may drop, when the rails are swung rearwardly, to prevent a return movement thereof.

6. In a load transferring device, the combination of a carriage having longitudinal bars held in spaced relation so as to receive a truck between them, parallel links pivoted to each of the bars, rails carried by the links, means engageable by the load on the truck as the latter moves rearwardly between said longitudinal bars to swing the links and rails carried thereby upwardly and rearwardly and thereby raise the load, latch bars pivoted near the front ends of said longitudinal bars and extending upwardly and rearwardly, means cooperating with the latch bars for limiting the rearward movement of the rails and for preventing a return movement thereof after the truck has been withdrawn.

7. In a load transferring device, the combination of a carriage having longitudinal bars held in spaced relation so as to receive a truck between them, links pivoted to each of the bars, rails carried by the links, latch bars pivoted to the carriage and extending upwardly and rearwardly, blocks secured to the rails and having recesses into which the upper ends of the latches may drop, when the rails are swung rearwardly, to prevent a return movement thereof, and means engageable by the axle of the truck, as the latter is backed beneath a load carried on said rails, to raise the latches out of the recesses and permit the rails to swing forwardly with the load as the truck is driven forwardly.

8. In a load transferring device, the combination of a carriage having longitudinal bars held in spaced relation so as to receive a truck between them, a pair of rails supported above the bars so as to be swung upwardly and rearwardly by a parallel motion, latch bars pivoted to the carriage and extending upwardly and rearwardly, blocks secured to the rear ends of the rails and having recesses into which the latches may drop, when the rails are swung upwardly, to prevent a return movement thereof, a transverse bar mounted for rocking movement and having a forwardly projecting lever with a downturned end engageable by the axle of the truck, as it is backed between the longitudinal bars of the carriage, to rock said transverse bar, and means connected with the transverse bar and lifted by its rocking movement, to raise the upper ends of the latch bars out of the recesses and permit the rails to swing forwardly with the load as the truck is driven forwardly.

9. In a load transferring device, a carriage having longitudinal bars held in spaced relation so as to receive a truck between them, guide bars for alining the truck wheels parallel to said longitudinal bars as the truck is backed in between them, parallel links pivoted to each of the bars, rails carried by the links, latch bars pivoted to the carriage and extending upwardly and rearwardly, blocks secured to the rear ends of the rails and having recesses into which the upper ends of the latches may drop, when the rails are swung upwardly, to prevent a return movement thereof, and means engageable by the axle of the truck, as the latter is backed beneath a load carried on said rails, to raise the latches out of the recesses and permit the rails to swing forwardly with the load as the truck is driven forwardly.

10. In a load transferring device, the combination of a carriage having series of parallel links pivoted thereto, a pair of parallel rails supported by the links to swing therewith, means for latching the rails substantially in their uppermost position, and wheels supporting the carriage and disposed in planes perpendicular to the planes of movement of said links and rails.

In testimony that I claim the foregoing as my own, I have hereto affixed my signature.

ABNER F. CALLISON.